United States Patent

Knoblach et al.

[11] Patent Number: 5,952,558
[45] Date of Patent: Sep. 14, 1999

[54] APPARATUS FOR DETERMINING THE CONCENTRATION PROFILES OF LIQUID OR GASEOUS SUBSTANCES ALONG A GIVEN PATH

[75] Inventors: Walter Knoblach, Forchheim; Klaus Franze, Nürnberg; Peter Jax, Erlangen, all of Germany

[73] Assignee: Siemens Aktiengesellschaft, Munich, Germany

[21] Appl. No.: 09/052,345

[22] Filed: Mar. 30, 1998

Related U.S. Application Data

[63] Continuation of application No. PCT/DE96/01741, Sep. 16, 1996.

[51] Int. Cl.⁶ ............................. G01M 3/22; F17D 5/04
[52] U.S. Cl. ............................ 73/40.5 R; 73/53.01
[58] Field of Search ..................... 73/40, 40.5 R, 73/49.2 T, 49.1

[56] References Cited

U.S. PATENT DOCUMENTS

| | | | |
|---|---|---|---|
| 3,964,292 | 6/1976 | Jackson | 73/40.5 R |
| 4,704,897 | 11/1987 | Kawase et al. | |
| 5,046,353 | 9/1991 | Thompson | 73/40.5 R |
| 5,271,901 | 12/1993 | Issel et al. | 73/40.5 R |
| 5,301,538 | 4/1994 | Recla | |
| 5,728,929 | 3/1998 | Gevaud | 73/40 |

FOREIGN PATENT DOCUMENTS

| | | |
|---|---|---|
| 0175219B1 | 3/1986 | European Pat. Off. |
| 1273279 | 7/1968 | Germany |
| 2431907 | 1/1976 | Germany |
| 2181259 | 4/1987 | United Kingdom |

OTHER PUBLICATIONS

Japanese Patent Abstract No. 62076425 (Akira et al.), dated Apr. 8, 1987.

*Primary Examiner*—Michael Brock
*Attorney, Agent, or Firm*—Herbert L. Lerner; Laurence A. Greenberg

[57] ABSTRACT

The apparatus enables accurate determination of concentration profiles of liquid or gaseous substances along a given path. A partially permeable line segment is laid along the route and the substances to be detected are allowed to penetrate into its interior. The line is filled with a test medium, and the column of the test medium is forced through the line at chronological intervals and moved past a sensor that is sensitive to the substances. A first closure is incorporated between the sensor and the line, and one or more closures are incorporated into the line to maintain the column of test medium substantially stationary in a position of repose of the system.

5 Claims, 1 Drawing Sheet

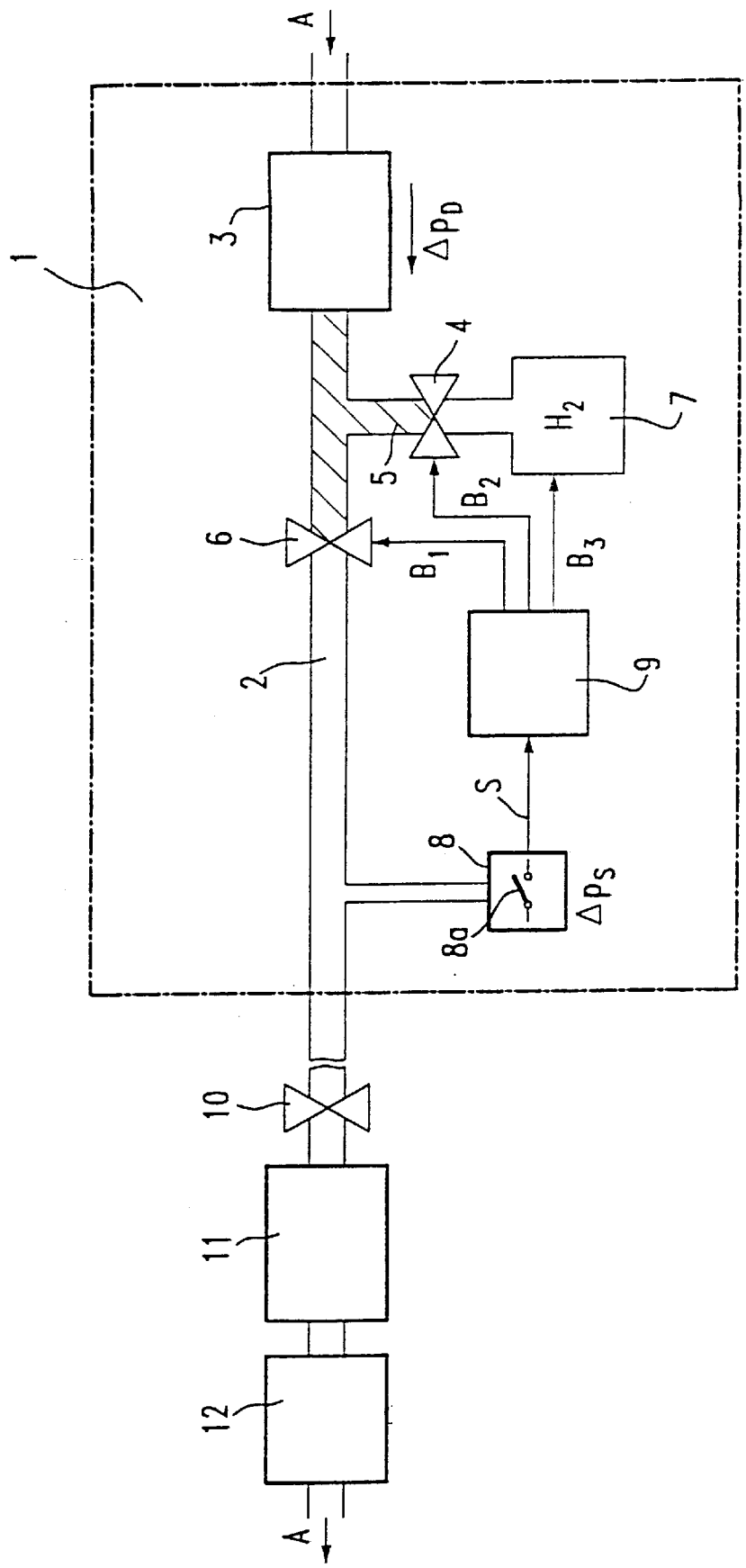

5,952,558

APPARATUS FOR DETERMINING THE CONCENTRATION PROFILES OF LIQUID OR GASEOUS SUBSTANCES ALONG A GIVEN PATH

Cross-Reference to Related Application

This application is a continuation of copending international application Ser. No. PCT/DE96/01741, filed Sep. 16, 1996, which designated the United States.

BACKGROUND OF THE INVENTION

1. Field of the Invention

The invention relates to an apparatus for determining the concentration profiles of fluids, i.e. liquid or gaseous substances along a given path, in which a line is laid along the path which allows substances to penetrate into its interior. The pipe is filled with a test medium, and the column of the test medium is forced through the pipe at chronological intervals and moved past a sensor that is sensitive to the substances. A first closure is incorporated between the sensor and the line.

2. Description of the Related Art

An apparatus of that type is known from German patent specification No. 34 31 907. There, the line is formed by a hose, which is laid along a given path to be monitored, such as a pipeline. The hose is filled with air as a test medium. If there is a leak, substances reach the site of the leak in the hose, and thus make a mark in the column of the test medium. One end of the hose is provided with a valve, which separates the sensor form the hose. The other end of the hose is open. To measure the concentration profile, the valve is opened and the column of test medium is moved past the sensor. By plotting the time when the column moves past in conjunction with the sensor signal, it can be ascertained where the leak is located along the route.

The prior art apparatus has the disadvantage, however, that routes to be monitored which are excessively long are subject to error deviations. In long lines, the column of test medium is not stationary, because of the influence of air pressure fluctuations, and these lead to major measurement errors.

SUMMARY OF THE INVENTION

It is accordingly an object of the invention to provide an apparatus for determining the concentration profiles of fluid substances along a given path, which overcomes the above-mentioned disadvantages of the heretofore-known devices and methods of this general type and which is improved in terms of measurement accuracy.

With the foregoing and other objects in view there is provided, in accordance with the invention, an apparatus for determining a concentration profile of a fluid substance along a given path, which comprises:

a line laid along a given path, the line being adapted to allow fluid substances to penetrate into an interior thereof;

a sensor which is sensitive to the fluid substances communicating with the line;

a column of test medium filling the line, the column of the test medium being forced through the line at chronological intervals and moved past the sensor;

a first closure between the sensor and the line; and at least one second closure incorporated into the line for maintaining the column of test medium substantially stationary in a position of repose.

In other words, the objects of the invention are satisfied with at least one second closure that is incorporated into the line and keeps the column of test medium substantially stationary in the position of repose of the system.

This apparatus has the advantage that the measurement errors caused by shifts in position of the column of test medium are avoided, and thus the measurement accuracy is increased.

In accordance with an added feature of the invention, there is provided a device for automatically opening the second closure when a pressure in the line falls outside a predetermined pressure range. In other words, the second closure is opened when a pressure value dropping in the line exceeds or undershoots a given threshold value.

There is also provided, in accordance with an additional feature of the invention, a timer circuit for automatically closing the second closure after a preset period of time has elapsed.

Furthermore, a pressure switch communicates with the line, and the pressure switch issues a control signal when a pressure in the line undershoots or exceeds a pressure threshold value.

In accordance with a concomitant feature of the invention, there is provided an electronic control unit for opening the second closure upon receiving the control signal furnished by the pressure switch.

Other features which are considered as characteristic for the invention are set forth in the appended claims.

Although the invention is illustrated and described herein as embodied in an apparatus for determining the concentration profiles of liquid or gaseous substances along a given path, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic block diagram.

DESCRIPTION OF THE PREFERRED EMBODIMENTS

Referring now to the figures of the drawing in detail there is seen an apparatus 1 of the invention. An arrow A designates the flow direction in a line 2. The line 2, which is formed by a diffusion hose for example, has a first closure (first valve 10) and a second closure (second valve 6) downstream of an optionally provided throttling segment 3. A gas sensor 11 is disposed downstream of the first valve 10, followed by a suction pump 12.

A third valve 4 is incorporated into a feed line 5, which discharges into the line 2 between the throttling segment 3 and the second valve 6. The feed line 5 connects the line 2 with an electrolysis cell 7, which furnishes calibrating gas as needed, in particular hydrogen.

A vacuum switch 8 is disposed downstream of the second valve 6 which communicates with an electronic control unit 9, as indicated by the arrow $B_1$. As the arrows $B_1$–$B_3$ show, the electronic control unit 9 communicates with the third valve 4, the second valve 6 and the electrolysis cell 7.

The mode of operation of the apparatus of the invention is as follows:

As long as no measurement is being made, the first valve 10, the second valve 6, and the third valve 4 are closed. Approximately atmospheric pressure prevails in the line 2. At the onset of measurement, the suction pump 12 is put into operation, and the first valve 10 is opened, so that the gas volume in the line 2 is aspirated away, past the gas sensors 11. This creates a negative pressure or differential pressure in the line 2. This vacuum or differential pressure is detected by the pressure switch 8. If a predetermined pressure threshold value is undershot, the pressure switch switches and outputs a control signal to the electronic control unit 9. The pressure threshold value is dimensioned such that it is lower than the atmospheric pressure minus an amount equivalent to the expected air pressure fluctuations. The pressure threshold thus defines the limit value of a predetermined, acceptable pressure range. The electronic control unit 9 puts the electrolysis cell 7 into operation and subsequently causes the third valve 4 to be opened briefly. After that, the second valve is opened and the electrolysis cell 7 is turned off. With the gas column aspirated out of the line 2 by the suction pump 12, the calibrating gas fed in is carried past the gas sensors 11 and thus marks the end of the column of test medium. Once the measurement has ended, the second valve 6 is closed again automatically, for instance by a timer circuit provided in the electronic control unit 9.

We claim:

1. An apparatus for determining a concentration profile of a fluid substance along a given path, comprising:
    a line laid along a given path, said line being adapted to allow fluid substances to penetrate into an interior thereof;
    a sensor sensitive to the fluid substances communicating with said line;
    a column of test medium filling said line;
    a pump for forcing said column of the test medium through said line at chronological intervals and for moving said column of the test medium past said sensor;
    a first closure between said sensor and said line;
    a second closure incorporated into said line for maintaining said column of the test medium substantially stationary in a position of repose; and
    a device for automatically opening said second closure when a pressure value dropping in said line exceeds or undershoots a given threshold value.

2. The apparatus according to claim 1, wherein said device includes a timer circuit for automatically closing said second closure after a preset period of time has elapsed.

3. The apparatus according to claim 1, wherein said device includes a pressure switch communicating with said line, said pressure switch issuing a control signal when a pressure in said line undershoots or exceeds a pressure threshold value.

4. The apparatus according to claim 3, wherein said device includes an electronic control unit for opening said second closure upon receiving the control signal furnished by said pressure switch.

5. An apparatus for determining a concentration profile of a fluid substance along a given path, comprising:
    a line laid along a given path, said line being adapted to allow fluid substances to penetrate into an interior thereof;
    a sensor sensitive to the fluid substances communicating with said line;
    a column of test medium filling said line;
    a pump for forcing said column of the test medium through said line at chronological intervals and for moving said column of the test medium past said sensor;
    a first closure between said sensor and said line; and
    a second closure incorporated into said line for maintaining said column of the test medium substantially stationary in a position of repose; and
    a device for automatically opening said second closure when a pressure in said line falls outside a predetermined pressure range.

* * * * *

UNITED STATES PATENT AND TRADEMARK OFFICE
CERTIFICATE OF CORRECTION

PATENT NO : 5,952,558
DATED : September 14, 1999
INVENTOR(S) : Walter Knoblach et al.

It is certified that error appears in the above-identified patent and that said Letters Patent is hereby corrected as shown below:

On the title page:

Item [30] should be inserted as follows:

Sept. 29, 1995     [DE]     Germany ..... 195 36 472.4

Signed and Sealed this

Eighteenth Day of July, 2000

Attest:

Q. TODD DICKINSON

*Attesting Officer*     *Director of Patents and Trademarks*